Patented Jan. 3, 1933

1,893,091

UNITED STATES PATENT OFFICE

LEOPOLD LASKA AND ARTHUR WERDERMANN, OF OFFENBACH-ON-THE-MAIN, GERMANY, ASSIGNORS TO GENERAL ANILINE WORKS, INC., OF NEW YORK, N. Y., A CORPORATION OF DELAWARE

DERIVATIVES OF THE DIPHENYLAMINE SERIES AND PROCESS OF MAKING SAME

No Drawing. Application filed October 29, 1930, Serial No. 492,084, and in Germany November 12, 1929.

Our present invention relates to new derivatives of the diphenylamine series, more particularly to such derivatives which correspond to the general formula:

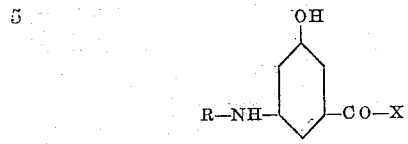

wherein X means —OH or —NHR and the R's stand for benzene nuclei which may be substituted by halogen atoms, alkyl or alkoxy groups.

The process of manufacturing these compounds, which is a further object of this invention, consists in heating 3.5-di-hydroxy-benzoic acid with at least two molecular proportions of an arylamine of the formula R—NH$_2$ (wherein R has the above signification) in the presence of an acid condensing agent. As first step of this process the arylamide of 3.5-dihydroxy benzoic acid of the formula:

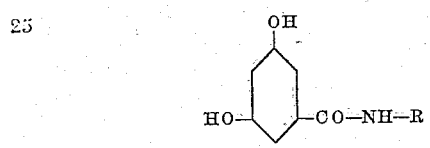

is obtained which yields with a second molecular proportion of the arylamine the arylamide of 3-arylamino-5-hydroxy-benzoic- acid of the formula:

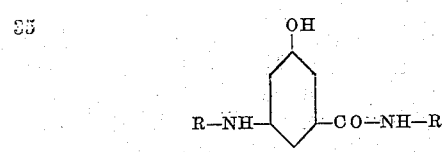

These compounds may be transformed by means of saponifying agents into the 3-arylamino-5-hydroxy-benzoic acids of the formula:

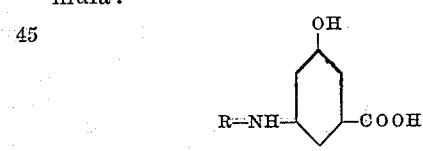

R having in each case the above signification.

The new compounds thus formed are valuable intermediates for the production of dyestuffs. The arylamides of this series are distinguished by a great affinity for the vegetable fiber, when used in alkaline solution.

In order to further illustrate our invention, the following examples are given, the parts being by weight and all temperatures in centigrade degrees. We wish it, however, to be understood that we are not limited to the particular products or reaction conditions mentioned therein.

Example 1

300 parts of 3.5-dihydroxy-benzoic acid, 1200 parts of aniline and 150 parts of hydrochloric acid of 24° Bé. are mixed together and the mixture is slowly heated to 180°, while the water distils off. Then the mass is boiled (at 185°) under a reflux condenser for 15 hours. Thereafter it is rendered alkaline by means of sodium carbonate and the excess of aniline is blown away by steam. The alkaline solution is filtered from a resinous residue. The filtrate is acidified and the light yellow precipitate thus formed is filtered off, washed and dried. It represents the anilide of 3.5-dihydroxy benzoic acid of the formula:

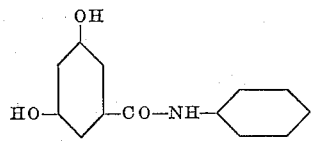

and melts when recrystallized from glacial acetic acid at 218°.

The aforesaid resinous residue is boiled with water, whereby it becomes solid, and is then dissolved in a dilute caustic soda solution. The solution is filtered and acidified. Thereby the anilide of 3-hydroxy-diphenyl-amine-5-carboxylic acid precipitates. It corresponds to the formula:

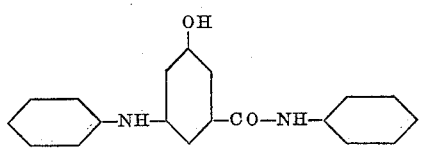

It melts at 160–161°.

100 parts of this compound are boiled with 500 parts of a 10% caustic soda solution for 24 hours. Thereafter the solution is filtered and acidified. Thereby 3-hydroxy-diphenyl-amine-5-carboxylic acid precipitates. This acid corresponds to the formula:

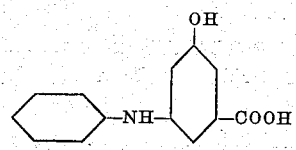

After dissolution in a dilute solution of sodium carbonate and re-precipitation, it melts at 220°.

*Example 2*

300 parts of 3.5-dihydroxy-benzoic acid, 1200 parts of aniline and 150 parts of zinc chloride are mixed and heated to 180° whereby the water distils away. Then the mass is heated to 180°–183° for 18 hours and thereafter rendered alkaline with sodium carbonate and subjected to a steam distillation. The remaining solution and the resinous residue yield when treated according to Example 1 the same compounds as there described.

*Example 3*

300 parts of 3.5-dihydroxy-benzoic acid, 1200 parts of 4-chloro-aniline and 100 parts of hydrochloric acid of 24° Bé. are mixed together and heated to 180° for 16 hours. Then the mass is poured into a solution consisting of 10000 parts of water of 50° C. and 900 parts of hydrochloric acid of 20° Bé., well stirred and filtered. From the filtrate the unchanged chloraniline may be recovered.

The mass from the filter is boiled several times with water and the aqueous suspension is filtered hot. From the cooled filtrate the 4-chloro-anilide of 3.5-dihydroxy benzoic acid melting at 182–193° crystallizes.

The mass left on the filter by the filtration of the aqueous suspension is dissolved in a dilute caustic soda solution, the solution is filtered and acidified. Thereby the 4-chloro-anilide of 3-hydroxy-4'-chloro-diphenyl-amine-5-carboxylic acid precipitates. It melts at 165–168° and corresponds to the formula:

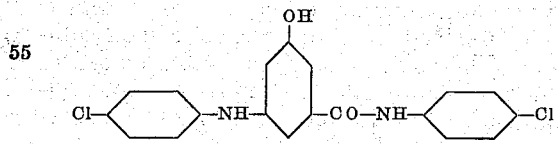

The two arylamides formed may also be separated instead of by the method just described, by the method of the foregoing examples.

When the 4-chloro-anilide of 3-hydroxy-4'-chloro-diphenylamine-5-carboxylic acid is saponified, for instance in the manner described in example 1, 3-hydroxy-4'-chloro-diphenylamine-5-carboxylic acid is obtained which melts at 212–215°.

*Example 4*

300 parts of 3.5-dihydroxy-benzoic acid, 1200 parts of 4-toluidine and 150 parts of hydrochloric acid of 24° Bé. are mixed and heated to 180° for 13 hours. The mass is poured into a mixture of 12000 parts of water of 50° and 1200 parts of hydrochloric acid of 20° Bé. while stirring. Thereby the excess of the 4-toluidine dissolves. The solution is filtered and the residue boiled with a dilute solution of sodium carbonate and filtered, the operations being repeated several times. The alkaline filtrates yield on acidification the 4-toluidide of 3.5-dihydroxy-benzoic acid melting at 190–192°.

The remaining resinous mass insoluble in dilute sodium carbonate solution is dissolved in a dilute caustic soda solution and the solution is filtered and acidified. Thereby the 4-toluidide of 3-hydroxy-4'-methyl-diphenyl-amine-5-carboxylic acid precipitates. It melts when recrytallized from xylene at 159° and corresponds to the formula:

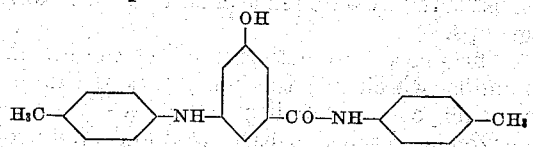

It yields by saponification 3-hydroxy-4'-methyl-diphenylamine-5-carboxylic acid melting at 222°.

*Example 5*

300 parts of 3.5-dihydroxy-benzoic acid, 1200 parts of 1.3-dimethyl-4-amino benzene and 150 parts of hydrochloric acid of 24° Bé. are heated together, while stirring, to 180–190°. The water which is formed distils away, the temperature being maintained for 24 hours. Then the excess of the meta-xylidine applied is extracted with hydrochloric acid, the residue is boiled several times with a dilute solution of sodium carbonate and filtered from the insoluble part. The filtrate yields the meta xylidide of 3.5-dihydroxy benzoic acid melting at 220–226°.

The insoluble part is dissolved in a dilute hot caustic soda lye, filtered and precipitated with hydrochloric acid. The dried precipitate melts, when recrystallized from alcohol, at 170–174°.

It represents the meta xylidide of 2'-4'-dimethyl-3-hydroxy-diphenylamine-5-carboxylic acid of the formula:

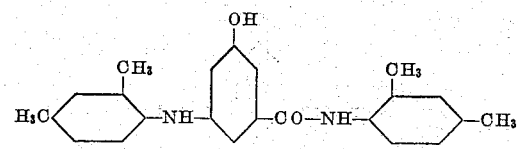

It yields by saponification 2'-4'-dimethyl-3- hydroxy-diphenylamine-5-carboxylic acid melting at 198-200°.

*Example 6*

3.5-dihydroxy-benzoic acid is condensed with 4-anisidine in the manner described in the foregoing examples. Thereby the 4-anisidide of 3-hydroxy-4'-methoxy-diphenylamine-5-carboxylic acid is obtained. It melts at 180-183° and corresponds to the formula:

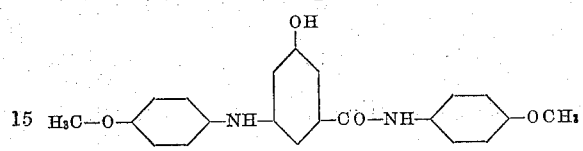

The arylamide may be boiled for 24 hours with five times its weight of a 10% caustic soda lye whereupon by acidifying the filtered solution the free 3-hydroxy-4'-methoxy-diphenylamine-5-carboxylic acid is obtained which melts, when reprecipitated from a sodium carbonate solution, at 182-185°.

We claim:—

1. Process which comprises heating 3.5-dihydroxy-benzoic acid with at least two molecular proportions of an arylamine of the formula R—NH$_2$ (wherein R means a benzene nucleus which may be substituted by halogen atoms having an atomic weight greater than 19, alkyl- or alkoxy groups of low molecular weight) in the presence of an acid condensing agent and heating the formed arylamide of 3-arylamino-5-hydroxy benzoic acid of the formula:

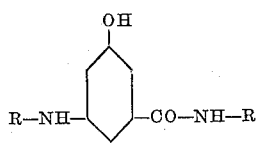

wherein the R's have the above signification, with an alkaline saponifying agent.

2. Process which comprises heating 3.5-dihydroxy-benzoic acid with at least two molecular proportions of an arylamine of the formula:

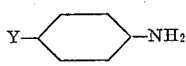

(wherein Y means chlorine, methyl or methoxy) in the presence of an acid condensing agent and heating the formed arylamide of 3-arylamino-5-hydroxy benzoic acid of the formula:

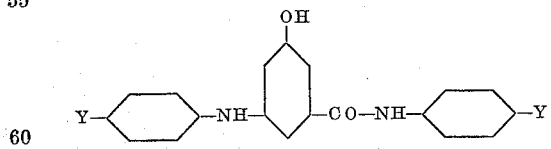

wherein Y has the above signification, with an alkaline saponifying agent.

3. Process which comprises heating 3.5-dihydroxy-benzoic acid with at least two molecular proportions of 4-toluidine in the presence of an acid condensing agent and heating the formed 4-toluidide of 3-(4'-tolylamino)-5-hydroxy-benzoic acid of the formula:

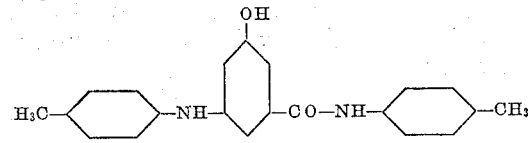

with an alkaline saponifying agent.

4. In the process claimed in claim 1 the step which comprises heating 3.5-dihydroxy-benzoic acid with at least two molecular proportions of an arylamine of the formula R—NH$_2$ (wherein R means a benzene nucleus which may be substituted by halogen atoms having an atomic weight greater than 19, alkyl- or alkoxy groups of low molecular weight) in the presence of an acid condensing agent.

5. In the process claimed in claim 2 the step which comprises heating 3.5-dihydroxy-benzoic acid with at least two molecular proportions of an arylamine of the formula:

wherein Y means chlorine, methyl or methoxy, in the presence of an acid condensing agent.

6. In the process claimed in claim 3 the step which comprises heating 3.5-dihydroxy benzoic acid with at least two molecular proportions of 4-toluidine in the presence of an acid condensing agent.

7. As new compounds the derivatives of the diphenylamine series of the general formula:

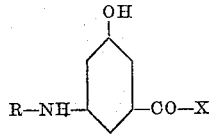

wherein X means —OH or —NH—R and the R's stand for benzene nuclei which may be substituted by halogen atoms, having an atomic weight greater than 19, alkyl- or alkoxy groups of low molecular weight, which compounds have a definite melting point, are soluble in caustic alkali and represent valuable intermediates for the production of dyestuffs.

8. As new compounds the derivatives of the diphenylamine series of the general formula:

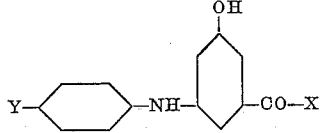

wherein X means —OH or

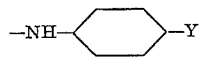

and the Y's stand for chlorine, methyl or methoxy, which compounds have a definite melting point, are soluble in caustic alkali and represent valuable intermediates for the production of dyestuffs.

9. As new compounds the derivatives of the diphenylamine series of the general formula:

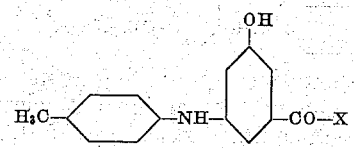

wherein X means —OH or

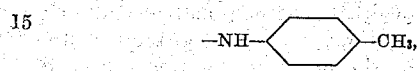

which compounds have a definite melting point, are soluble in caustic alkali and represent valuable intermediates for the production of dyestuffs.

10. As new compounds the arylamides of 3-arylamino-5-hydroxy-benzoic acids of the formula:

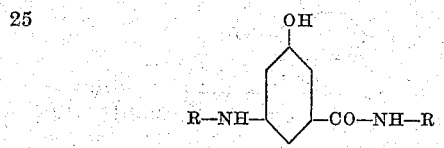

wherein the R's mean benzene nuclei which may be substituted by halogen atoms having an atomic weight greater than 19, alkyl or alkoxy groups of low molecular weight, which compounds have a definite melting point, are soluble in caustic alkali and show in this solution a great affinity to the vegetable fiber.

11. As new compounds the arylamides of 3-arylamino-5-hydroxy-benzoic acids of the formula:

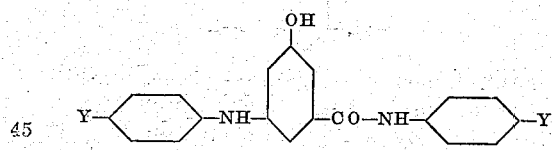

wherein the Y's stand for chlorine, methyl or methoxy, which compounds have a definite melting point, are soluble in caustic alkali and show in this solution a great affinity to the vegetable fiber.

12. As a new compound the 4-toluidide of 3-(4'-tolylamino)-5-hydroxy-benzoic acid of the formula:

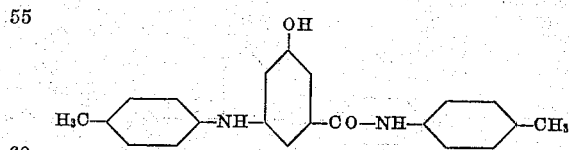

which compound melts when recrystallized from xylene at 159°, is soluble in caustic alkali and shows in this solution a great affinity to the vegetable fiber.

13. As a new compound, the anilide of 3-hydroxydiphenylamine-5-carboxylic acid of the following formula:

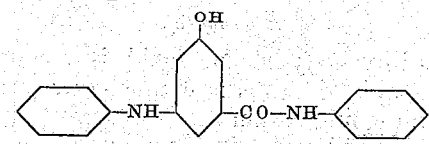

which compound melts after recrystallization at 160° to 161°, is soluble in caustic alkali and shows in this solution a great affinity to the vegetable fiber.

14. As a new compound, the 4-chloro-anilide of 3-hydroxy-4'-chloro-diphenylamine-5-carboxylic acid of the formula:

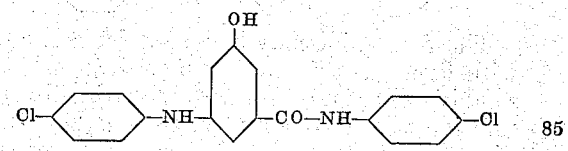

which compound melts after recrystallization at 165° to 168°, is soluble in caustic alkali and shows in this solution a great affinity to the vegetable fiber.

In testimony whereof, we affix our signatures.

LEOPOLD LASKA.
ARTHUR WERDERMANN.